United States Patent Office 3,339,881
Patented Sept. 5, 1967

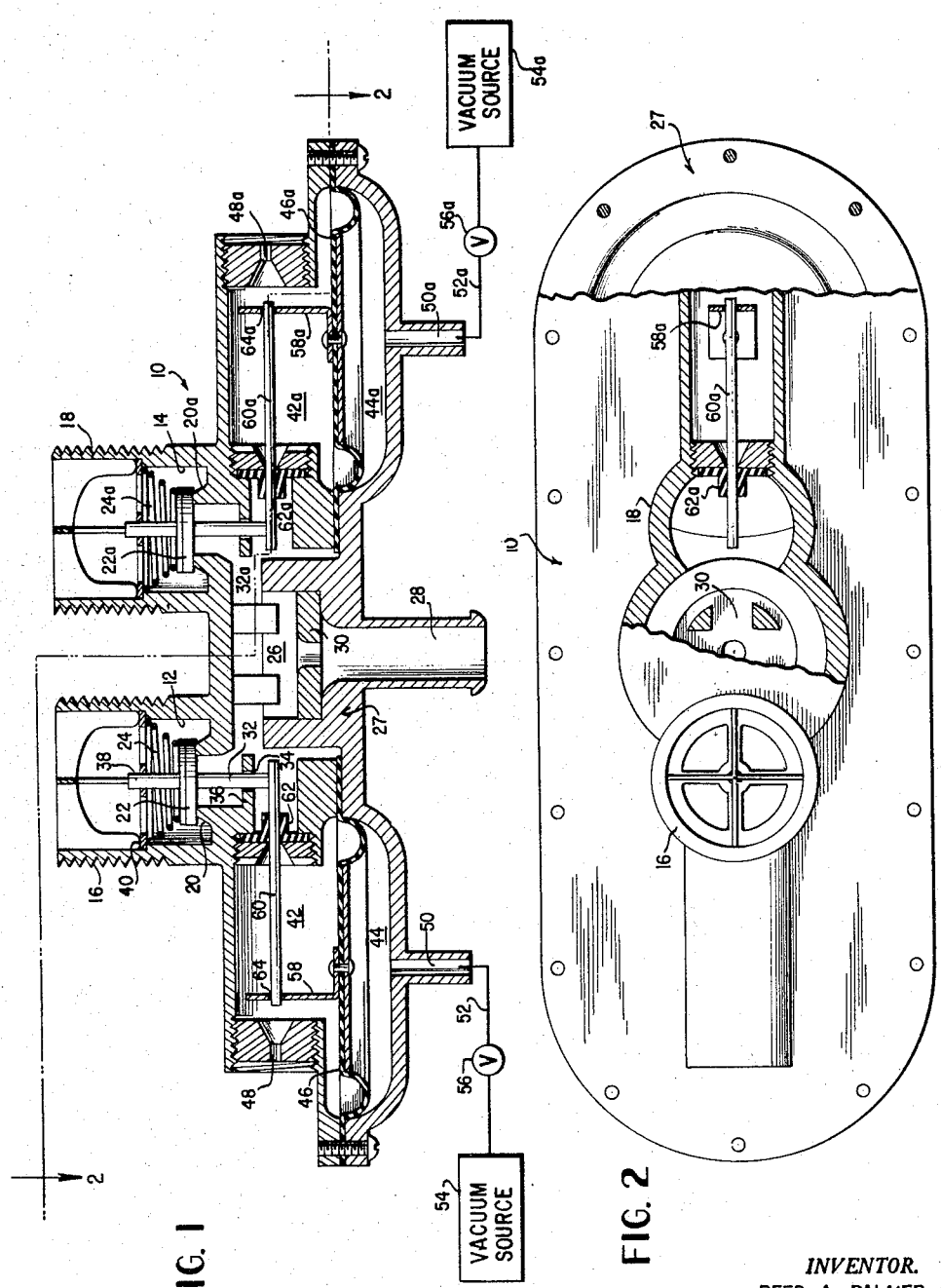

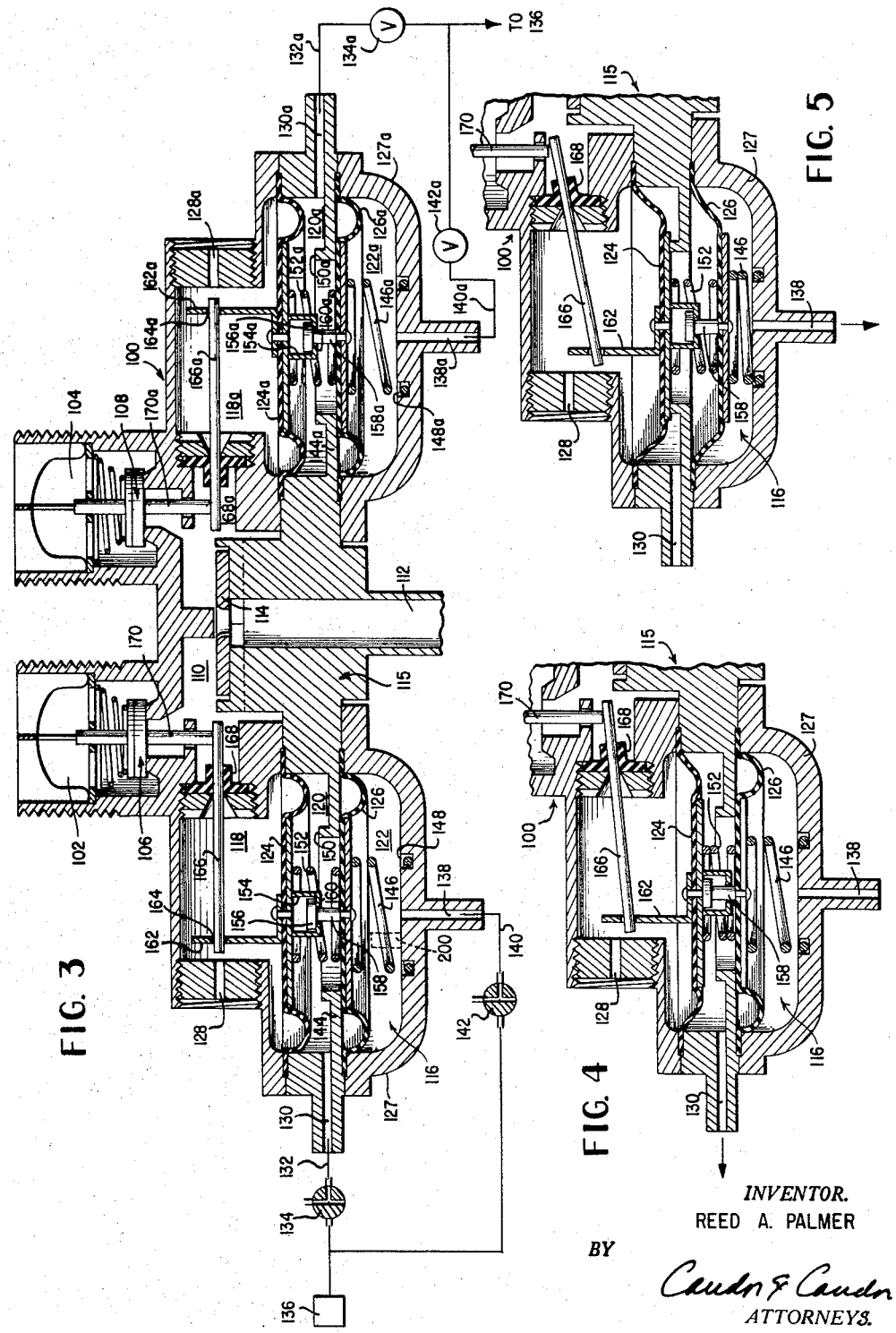

3,339,881
WATER MIXING VALVE ASSEMBLY
Reed A. Palmer, Los Alamitos, Calif., assignor to Robertshaw Controls Company, a corporation of Delaware
Original application Oct. 5, 1961, Ser. No. 143,144. Divided and this application Mar. 10, 1965, Ser. No. 438,512
5 Claims. (Cl. 251—58)

This application is a divisional application of the copending patent application, Ser. No. 143,144, filed Oct. 5, 1961, now abandoned.

This invention relates to water mixing valve assemblies, and more particularly to control mechanism for water mixing valves especially adapted for employment in automatically controlled systems.

It is one object of the present invention to provide a water mixing valve assembly for receiving water from a hot water supply source and a cold water supply source and mixing water from both of the sources to discharge the water at any of a plurality of selected temperatures under the control of a pressure responsive control system.

It is another object of the invention to provide a valve of the type referred to above which may be readily modified to increase or decrease the number of selected temperatures available.

It is another object of the invention to provide a water mixing valve assembly of the type referred to above wherein the control valves are readily accessible for servicing.

The foregoing, and other objects, are achieved in a valve assembly having a housing whose upper portion contains a poppet valve controlled hot water inlet and a poppet valve controlled cold water inlet. A rocker arm mounted in a flexible seal is supported for pivotal movement in engagement with the stem of the valve poppet in a fashion such that pivotal movement of the rocker arm about the fulcrum defined by the flexible seal shifts the valve or poppet head toward and away from its closed position. The upper portion of the housing cooperates with a lower portion to define a control chamber which is divided into two or more portions by a diaphragm assembly clamped between the two housing portions. In one embodiment, a single diaphragm is employed, the upper portion of the diaphragm being exposed to atmospheric pressure while the lower portion of the diaphragm is selectively exposed to atmospheric pressure or to a vacuum source. Flexing movement of the diaphragm is transmitted to the rocker arm to shift the valve assembly.

In a second embodiment, two diaphragms are employed with each poppet valve. In the second embodiment, the upper valve housing of the first embodiment and modified lower valve housing are employed and are separated by an adapter spacer secured between the upper and lower housing portions. Two diaphragms are employed in each control chamber and are respectively clamped between the spacer portion and the upper and lower housing. In this arrangement, the upper diaphragm is coupled to the rocker arm as in the previous embodiment. A lost motion coupling between the two diaphragms permits limited relative flexing movement of the upper diaphragm relative to the lower diaphragm. By dimensioning the lost motion coupling and regulating movement of the lower diaphragm, the valve controlling rocker arm may be positioned at any of four selected positions, one of the positions corresponding to the closed position of the valve. Vacuum may be supplied to one or both of the chambers defined between the two diaphragms and beneath the lower diaphragm, the uppermost chamber above the upper diaphragm being continuously vented to atmosphere. By selectively connecting one or both of the two remaining chambers to vacuum, selected positions of the controlled valve can be achieved. The rocker arm abuts the valve poppet at its lower end, and thus the valve poppet is readily removable from a fitting at the upper end of the housing.

This valve is especially useful in an automatically programmed washing machine in which it is desired to supply water at one or more temperatures to the machine during various portions of the washing cycle. Vacuum actuated control valves are readily adapted to a programmed type control and, by establishing selective relative openings of the hot and cold water control valve, the temperature of water dispensed from the valve assembly may be regulated.

Other objects and features of the invention will become apparent by reference to the following specification and to the drawings.

In the drawings:

FIG. 1 is a cross-sectional view of one form of mixing valve assembly embodying the invention;

FIG. 2 is a cross-sectional view of the valve assembly of FIG. 1 taken approximately on line 2—2 of FIG. 1;

FIG. 3 is a cross-sectional view, similar to FIG. 1, of a second form of valve assembly embodying the invention;

FIG. 4 is a partial cross-sectional view of one control chamber of the valve of FIG. 3 showing various parts in a position different than that of FIG. 3; and FIG. 5 is a cross-sectional view similar to FIG. 4, showing the parts in still another position.

The valve assembly of FIG. 1 includes an upper valve housing designated generally 10 which is formed with a first inlet passage 12 and a second inlet passage 14 which, when the valve is in use, are respectively connected to a supply of hot water and to a supply of cold water as by conventional fittings, not shown, which are secured to upper housing 10 as by external threads 16 and 18 on those portions of housing 10 defining the inlet passages. Each inlet passage is formed with an internal valve seat such as 20, 20a, against which a valve head in the form of a poppet 22 or 22a is resiliently biased by a compression spring 24 or 24a. The direction of seating of the valve heads is such that in addition to being resiliently biased to their closed position by the associated compression spring 24 or 24a, the pressure of the supply source connected to the valve tends to maintain the heads in their closed position.

Both inlet passages 12 and 14 communicate on the lower side of their respective valve with a mixing chamber 26 cooperatively defined by upper housing 10 and a lower housing 27 formed with an outlet passage 28 communicating with chamber 26 through a flow restricting orifice washer 30.

Since each of the inlet passage control valves is identical, and the means employed to independently actuate the respective valves is likewise identical, only the structure associated with the hot water inlet passage 12 will be described in detail, it being understood that identical structure is employed for controlling flow of cold water through inlet passage 14. Structure associated with cold water passage 14 is designated in the drawings by reference numerals identical to those employed in the following description followed by the subscript a.

Valve head or poppet 22 is supported and guided for movement toward and away from its seat 20 by the sliding engagement between a lower valve stem 32 within a bore 34 in a projection 36 on housing 10. An upper valve stem 38 is slidably received in a central hub portion of a washer 40 secured in inlet passage 12. Washer 40 also defines the upper seat of compression spring 24.

At one side of inlet passage 12 upper housing 10 and lower housing 27 cooperate to define a control chamber which is divided into an upper portion 42 and a lower portion 44 by a flexible diaphragm 46 clamped between the upper and lower housings. The upper portion 42 of the control chamber is in continuous communication with atmosphere through a venting orifice 48. Lower portion 44 of the control chamber is connected through passage 50 and a schematically illustrated conduit 52 to a suitable vacuum source schematically illustrated at 54. A valve 56 is connected in conduit 52 and functions as a three-way valve to selectively connect lower portion 44 of the control chamber to vacuum source 54 or to close off vacuum source 54 and connect lower portion 44 of a control chamber to atmosphere. Valve 56 may be any of a great number of commercially available three-way valves and its structural details form no part of this invention. In certain applications, valve 56 may be automatically controlled.

Diaphragm 46 is so constructed that when the pressure in chambers 42 and 44 is the same, the diaphragm assumes the positions shown in FIG. 1. When chamber 44 is connected to vacuum source 54 by the operation of valve 56, the pressure differential across diaphragm 46 flexes the diaphragm downwardly from the position shown in FIG. 1. This motion is employed to lift valve head 22 from its seat 20 to thereby permit the flow of water downwardly through inlet passage 12 into mixing chamber 26. To transmit motion of diaphragm 46 to valve head 22, a bracket 58 is fixedly secured to the upper side of diaphragm 46. A rocker arm 60 is mounted in a flexible seal 62 in housing 10, and one end of rocker arm 60 is received within a bore 64 in bracket 58. The opposite end of rocker arm 60 projects through flexible seal 62 into the inlet passage and is in abutment with the lower end of lower valve stem 32.

When both of chambers 42 and 44 are connected to atmosphere, the diaphragm is in the position shown in FIG. 1 and valve head 22 is maintained against its seat 20 by compression spring 24. When valve 56 is manipulated, either automatically or manually, to connect lower portion 44 of the control chamber to vacuum source 54, diaphragm 46 is flexed downwardly from the FIG. 1 position, thus drawing bracket 58 downwardly. The engagement between bracket 58 and rocker arm 60 draws the left-hand end of rocker arm 60 downwardly as viewed in FIG. 1, and the rocker arm pivots in a counterclockwise direction about the fulcrum defined by flexible seal 62. This action lifts the right-hand end of rocker arm 60 upwardly and its abutment with the lower end of valve stem 32 lifts the valve upwardly away from seat 20 to establish communication between the upper portion of inlet passage 12 and mixing chamber 26. Flexible seal 62 seals the upper portion 42 of the control chamber from mixing chamber 26, thus preventing the flow of water into the control chamber.

As previously stated, an identical arrangement is provided for opening and closing the valve defined by valve head 22a and seat 20a in cold water passage 14. The flexing of diaphragm 46a is employed to pivot a second rocker arm 60a to lift the valve head 22a from its seat to permit flow of water through inlet passage 14 into mixing chamber 26. While the schematic representation of conduit 52a, and vacuum source 54a show separate vacuum sources, it should be readily apparent that in an actual structure, a single vacuum source can be employed to control both diaphragms.

The structure of FIGS. 1 and 2 enables water to be supplied to outlet passage 28 at any one of three selected temperatures, assuming a constant temperature hot water source is connected to inlet passage 12 and a constant temperature cold water source is connected to inlet passage 14. When diaphragm 46 is fixed to lift valve head 22 from its seat, the temperature at outlet 28 is that of the hot water source. Likewise, when valve head 22a is opened and valve head 22 is closed, the temperature in outlet passage 28 is that of the cold water source. When both inlet passage valves are open, the temperature at outlet passage 28 is the average temperature of the two water sources, assuming equal flow characteristics through the respective inlet passages to provide either five or seven different water temperatures at the outlet in dependence upon internal dimensioning of the control diaphragm assembly.

In the embodiment of FIGS. 3 through 5, an upper valve housing 100 is provided with a hot water inlet 102 and a cold water inlet 104, each of the inlets having a valve designated generally 106 and 108 respectively. Since the upper housing 100 is the same as upper housing 10 of the FIGS. 1 and 2 embodiment and the inlet valves are identical in construction and relationship to housing 100 as those described in detail in the FIG. 1 embodiment, a detailed description of these valves will be omitted. As in the FIG. 1 embodiment, both inlet passages, when their respective valves are open, communicate with an internal mixing chamber 110 from which the water passes to the valve outlet 112 through a flow restricting orifice plate 114. In this embodiment, mixing chamber 110 is cooperatively defined by upper housing 100 and a central housing member 115.

As in the previously described embodiment of FIG. 1, the control assembly for valve 106 is identical to the control assembly for valve 108, and hence only the control assembly for valve 106 will be described in detail, it being understood that the description is equally applicable to the control assembly for the valve 108. As in the previous case, corresponding parts of the control assemblies of the two valves, a subscript "a" being added to the reference numerals applied to the control structure for valve 108.

In the embodiment of FIGS. 3 through 5, housing 100 is formed with a control chamber designated generally 116 which is divided into an upper end chamber 118 and intermediate or central chamber 120, and a lower end chamber 122 by a pair of spaced flexible diaphragms identified as upper diaphragm 124, clamped between upper housing 100 and central housing member 115, and lower diaphragm 126, clamped between central housing member 115 and a lower housing 127. Upper chamber 118 is continuously vented to atmospheric pressure through venting orifice 128. Intermediate chamber 120 is connected through passage 130, conduit 132 and valve 134 to a vacuum source 136. A similar connection is provided for chamber 122 through passage 138, conduit 140, and valve 142. As in the previous case, valves 134 and 142 may take any of several forms of commercially available three-way valves and function either to provide a direct connection from their respective passages 130 and 138 to vacuum source 136 or alternatively to seal off the vacuum 136 and connect the respective passages 130 and 138 to atmosphere.

To define certain end limits to flexing movement of diaphragms 124 and 126, an annular stop member 144 is formed in housing 100 to project into the interior of chamber 120. The lower surface of stop 144 defines the upper limit of movement of lower diaphragm 126 as shown in FIG. 3, and diaphragm 126 is normally maintained against the lower surface of stop 144 by a compression spring 146 engaged at one end in an annular groove 148 in the bottom of chamber 122 and seated at its upper end against the lower surface of diaphragm 126. The upper surface of stop 144 is provided with an upwardly projecting lip or flange 150 which is engageable with the lower surface of diaphragm 124 to define the lower limit of flexing movement of diaphragm 124.

A second compression spring 152 is engaged between the opposed faces of diaphragms 124 and 126 to bias the diaphragms away from each other. Movement of diaphragm 124 away from diaphragm 126 is limited by a lost motion coupling assembly which includes a bracket 154 fixedly mounted on the lower surface of diaphragm 124 which slidably receives the enlarged head 156 of a coupling pin 158 fixedly secured at its lower end to diaphragm 126. The lower ends of bracket 154 project inwardly beneath the enlarged head 156 of pin 158 as at 160 thereby limiting movement of diaphragm 124 away from diaphragm 126 under the biasing action of compression spring 152.

As in the previous case, a bracket 162 is fixedly secured to the upper end of diaphragm 124 and is bored as at 164 to receive one end of a rocker arm 166. Rocker arm 166 projects through a flexible seal 168 into mixing chamber 110 and that end of rocker arm 166 disposed in chamber 110 is located in vertical abutment with the lower end of the lower valve stem 170 of valve 106. As in the previous case, flexible seal 168 serves as a fulcrum about which rocker arm 160 pivots upon vertical movement of its bracket 162 occasioned by flexing movement of the diaphragms 124 and 126 in a manner to be described below. Pivotal movement of rocker arm 166 opens valve 106 by an amount dependent upon vertical movement of bracket 162.

When the valve assembly of FIGS. 3 through 5 is operated as a five temperature water mixer, valve 106 is controlled by diaphragms 124 and 126 to be located either in the closed position shown in FIG. 3, in an intermediate open position when, as when diaphragms 124 and 126 are located in the relative position shown in FIG. 4, or a fully open position, at which time the diaphragms 124 and 126 are in the relative position shown in FIG. 5. With each of the hot water control valves 106 and cold water control valve 108 being capable of being located in any of three positions, five possible temperatures are thus available at outlet 112. These temperatures are as follows:

(1) With cold water control valve 108 closed, the temperature at outlet 112 will be that of the hot water supply source when hot water valve 106 is in either its partially or fully open position.

(2) With hot water control valve 106 closed, the temperature in outlet 112 will be that of the cold water supply source when cold water control valve 108 is in either of its partially or fully open position.

(3) With both valves 106 and 108 partially open, or with both valves 106 and 108 fully open, the temperature at outlet 112 will be the average temperature of the hot and cold water supply sources.

(4) With hot water valve 106 partially open and cold water valve 108 fully open, the water temperature will be somewhat below the average temperature of paragraph (3) above, but higher than the temperature of the cold water source.

(5) With hot water control valve 106 fully open and cold water control valve 108 partially open, the temperature in outlet 112 will be above the average temperature of the two sources but less than the temperature of the hot water source.

Referring now to FIG. 3, when valve 106 is in the illustrated closed position, both of intermediate chambers 120 and lower chamber 122 are vented to atmosphere through their respective valves 134 and 132. To shift valve 106 from the closed position of FIG. 3 to a partially open position, valve 134 is actuated to connect intermediate chamber 120 to vacuum source 136. This action causes diaphragm 124 to flex downwardly from the FIG. 3 position to that of FIG. 4, this flexing movement of diaphragm 124 being limited by the engagement between the lower surface of diaphragm 124 and the upper surface of head 156 of pin 158. Pin 158 and diaphragm 126 do not move first, because diaphragm 126 is biased by spring 146 against the lowest surface of stop 144, and second, because the connection of intermediate chamber 120 to vacuum source 136 creates a pressure differential across diaphragm 126 tending to hold diaphragm 126 against stop 144 because lower chamber 122 is still connected to atmospheric pressure. It should be noted that the amount of movement of diaphragm 124 between the FIG. 3 and FIG. 4 positions represent the amount of lost motion in the mechanical coupling between diaphragm 126 and diaphragm 124. To shift valve 106 from the partially open position described above to a fully open position, valve 142 is actuated to connect lower chamber 122 to vacuum source 136. The connection of chamber 122 to vacuum source 136 equalizes the pressure exerted on the opposite sides of diaphragm 122 and compression spring 152, which is selected to be somewhat stiffer than compression spring 146, resiliently urges diaphragm 126 away from diaphragm 124. Since the upper surface of diaphragm 124 is exposed to atmospheric pressure while the lower surfaces of both diaphragms 124 and 126 are exposed to vacuum, the pressure differential across the complete diaphragm assembly (both diaphragms), shifts the diaphragm assembly as a unit downwardly until diaphragm 124 engages the upper surface of lip or flange 150 on stop member 144. A comparison between FIGS. 4 and 5 indicates that this position of diaphragm 124 is lower than that assumed by diaphragm 124 when only intermediate chamber 120 is connected to vacuum and hence rocker arm 166 is pivoted downwardly from the FIG. 4 position, thus lifting valve stem 170 a greater distance to shift valve 106 to its fully open position.

The five temperature water mixing valve as described above can be modified to produce nine temperatures at outlet passage 112 by a slight modification. In the five temperature embodiment described above, the amount of lost motion between enlarged head 156 of pin 158 and diaphragm 124 is approximately one-half the total distance between the flange or lip 150 of stop 144 and the lower surface of diaphragm 124, when diaphragm 124 is in the normal position of FIG. 3. In other words, the amount of flexing movement of diaphragm 124 between the FIGS. 3 and 4 positions is substantially equal to the subsequent flexing movement of diaphragm 124 between the FIGS. 4 and 5 positions.

To adapt the valve of FIG. 3 to produce nine temperatures, the amount of lost motion between diaphragm 124 and enlarged head 156 is slightly reduced so that the amount of lost motion is less than one-half of the complete range of flexing movement of diaphragm 124. In addition, a stop lug indicated at broken lines in FIG. 3 at 200 is provided to define a lower limit to movement of diaphragm 126 at a location slightly above the position of diaphragm 126 in FIG. 4 so that when diaphragm 126 is engaged with the upper end of stop 200, the coupling between pin 158 and bracket 154 is such that diaphragm 124 is located above lip 150 on stop 144 when head 156 is engaged upon shoulder 160 of bracket 154.

With the latter arrangement, connection of intermediate chamber 120 to vacuum source 136 when lower chamber 122 is connected to atmosphere causes diaphragm 124 to move downwardly until diaphragm 124 engages the upper surface of pin 156, in the fashion illustrated in FIG. 4. This set of connections would provide a first open position of valve 106. To open valve 106 further, valve 134 is actuated to connect intermediate chamber 120 to atmosphere, and valve 142 is actuated to connect lower chamber 122 to vacuum source 136. This action causes diaphragm 126 to move downwardly until it engages the upper surface of stop 200. With the last described dimensional relationship, coupling pin 158 pulls diaphragm 124 downwardly, by virtue of the engagement of enlarged head 156 with upwardly facing shoulder 160 until diaphragm 126 engages stop 200, at which time diaphragm 124 is disposed somewhat above the upper surface of lip 150 on stop 144. This provides a second open position of valve 106.

To move the valve to its fully open position, both chambers 120 and 122 are connected to vacuum. Diaphragm 124 then moves downwardly from the last previously described position until it engages lip 150, this downward movement being permitted by the lost motion coupling between pin 158 and bracket 154. The provision of the two intermediate positions for each of the two valves by the dimensional relationship described above would afford four additional temperatures to those described above in connection with the five temperature arrangement. For convenience, the possible outlet temperatures are indicated below in tabular form, $H_C$ representing the closed position of hot water control valve 106, $H_1$ and $H_2$ representing the two partially open positions, and $H_F$ representing the fully open position; a similar notation $C_C$, $C_1$, $C_2$, $C_F$, referring to cold water control valve 108.

| Valve positions: | Outlet water temperature |
|---|---|
| (1) $H_C$, $C_C$ | Both valves closed, no water out. |
| (2) $H_C$, $C_1$—$H_C$, $C_2$—$H_C$, $C_F$ | Cold water source temperature. |
| (3) $C_C$, $H_1$—$C_C$, $H_2$—$C_C$, $H_F$ | Hot water source temperature. |
| (4) $H_1$, $C_1$—$H_2$, $C_2$—$H_F$, $C_F$ | Average of hot and cold water source temperature. |
| (5) $H_1$, $C_2$ | Slightly cooler than 4 above. |
| (6) $H_1$, $C_F$ | Cooler than 5 above but hotter than cold water source. |
| (7) $H_2$, $C_1$ | Slightly warmer than 4 above. |
| (8) $H_2$, $C_F$ | Between 4 and 5 above. |
| (9) $H_F$, $C_1$ | Hotter than 7 above but cooler than hot water source. |
| (10) $H_F$, $C_2$ | Between 4 and 7 above. |

From a comparison of FIGS. 1 and 3, it is seen that the upper housing 10 and 100, together with the associated inlet passages, control valves, flexible seals and rocker arms are identical between the two embodiments and thus constitute a single sub-assembly equally well adapted for use in either of the illustrated embodiments. Further, it should be noted that the five temperature embodiment of valve can be readily converted to a nine temperature valve merely by the provision of stop 200, which may conveniently take the form of an adjustable screw mounted in a suitably bored and tapped hole through lower housing member 127 of the FIG. 3 embodiment. The particular arrangement of the inlet valves is such that the valves may be readily serviced while the entire mixing valve assembly is mounted upon a washing machine merely by disconnecting the conventional hose connections made to the upper ends of the respective inlet passages. The orientation of the valve heads is such that they may be readily removed and replaced where necessary.

While exemplary embodiments of the invention have been described, it will be apparent to those skilled in the art that the disclosed embodiments may be modified. Therefore, the foregoing description is to be considered exemplary rather than limiting, and the true scope of the invention is that defined in the following claims.

While the form of the invention now preferred has been disclosed as required by the statutes, other forms may be used, all coming within the scope of the claims which follow.

What is claimed is:

1. In combination, a housing means having an inlet interconnected to an outlet, a valve seat disposed in said inlet, a valve member for opening and closing said valve seat and having a stem passing through said valve seat, a rocker arm pivotally carried by said housing means and having one end engaging said stem, a substantially hat-shaped resilient member carried by said housing and having a disc portion disposed against said housing and a small cylindrical portion extending from one side of said disc portion, said resilient member having a bore passing longitudinally therethrough and telescopically and sealingly receiving said rocker arm, means compressing said disc portion against said housing to seal said resilient member to said housing, and a pneumatically operated actuator carried by said housing means and being interconnected to the other end of said rocker arm whereby said actuator pivots said rocker arm to open and close said valve seat.

2. A combination as set forth in claim 1 wherein said valve member opens in a direction opposite to the fluid flow through said valve seat.

3. A combination as set forth in claim 1 wherein said actuator comprises a fixed wall means and a flexible diaphragm cooperating together to define a chamber therebetween.

4. A combination as set forth in claim 3 wherein said diaphragm carries post means interconnected to said other end of said rocker arm.

5. A combination as set forth in claim 4 wherein said post means has an aperture means passing therethrough and receiving said other end of said rocker arm.

References Cited

UNITED STATES PATENTS

| | | | |
|---|---|---|---|
| 258,432 | 5/1882 | Keith | 251—303 |
| 737,985 | 9/1903 | White | 251—58 |
| 1,181,370 | 5/1916 | Brown | 137—606 X |
| 2,138,937 | 12/1938 | Petroe | 74—18.1 |
| 2,330,925 | 10/1943 | Rosano | 251—335.1 X |
| 2,601,231 | 6/1952 | Smith et al. | 251—61 X |
| 2,912,012 | 11/1959 | Klingler | 251—335 X |
| 3,018,798 | 1/1962 | Bowlus | 251—335 X |
| 3,053,454 | 9/1962 | Waterfill | 137—606 X |

FOREIGN PATENTS

| | | |
|---|---|---|
| 443,657 | 7/1912 | France. |
| 297,129 | 6/1932 | Italy. |

ALAN COHAN, *Primary Examiner.*

W. F. O'DEA, I. WEIL, *Examiners.*

D. ZOBKIW, *Assistant Examiner.*